Sept. 7, 1926.
G. E. HENDERSON
Re. 16,417
ELECTRIC LEVEL INDICATOR
Original Filed Sept. 26, 1912 2 Sheets-Sheet 1
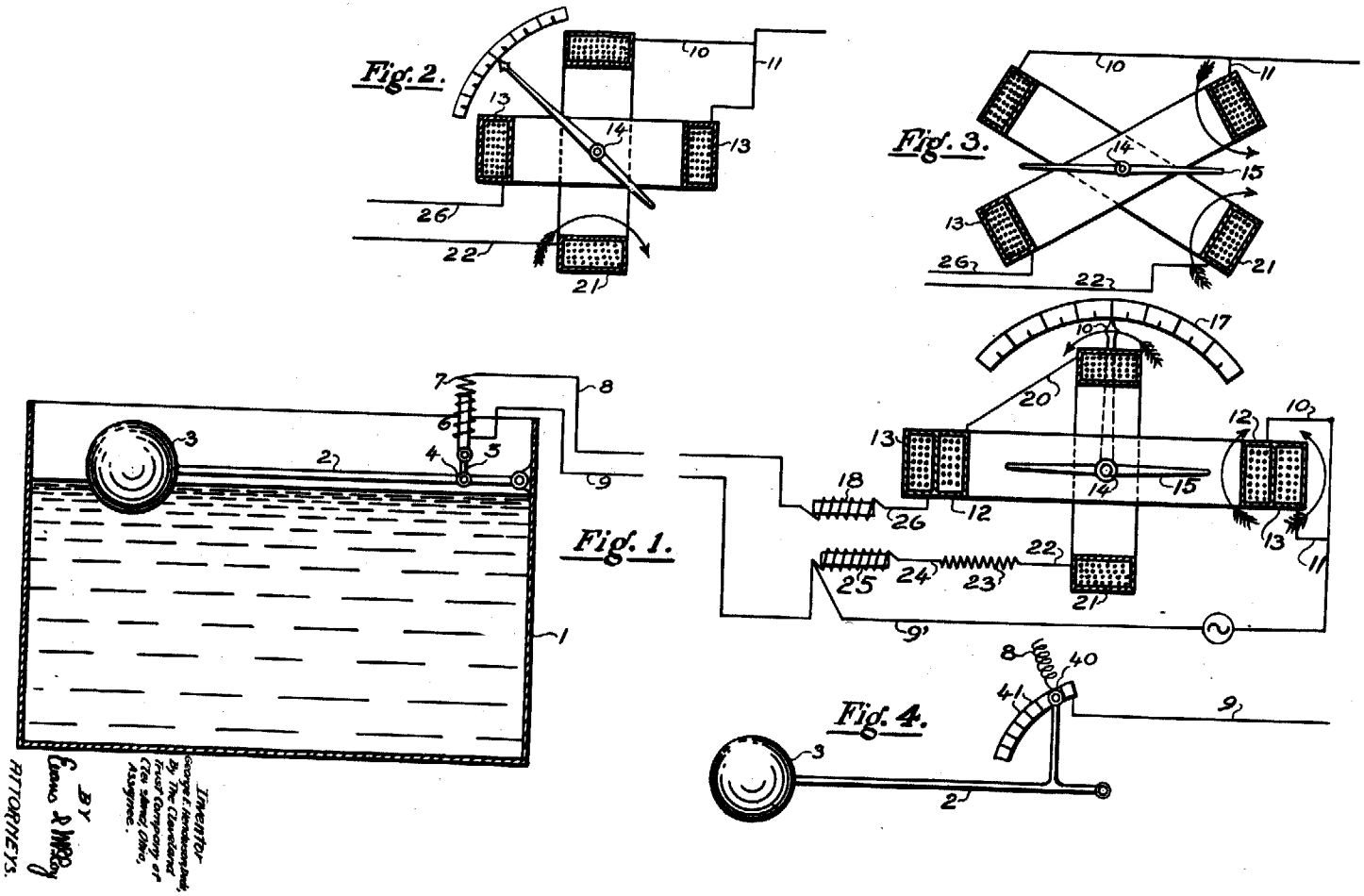

Sept. 7, 1926.

G. E. HENDERSON

Re. 16,417

ELECTRIC LEVEL INDICATOR

Original Filed Sept. 26, 1912 2 Sheets-Sheet 2

Inventor
George E. Henderson, Decd.
By The Cleveland Trust Company of Cleveland, Ohio, Assignee.
BY Evans & McCoy.
ATTORNEYS.

Reissued Sept. 7, 1926. Re. 16,417

UNITED STATES PATENT OFFICE.

GEORGE E. HENDERSON, DECEASED, LATE OF NEAR MANTON, CALIFORNIA; BY THE CLEVELAND TRUST COMPANY, ASSIGNEE, OF CLEVELAND, OHIO.

ELECTRIC LEVEL INDICATOR.

Original No. 1,152,730, dated September 7, 1915, Serial No. 722,485, filed September 26, 1912. Application for reissue filed March 24, 1926. Serial No. 97,147.

This invention relates to means for electrically indicating at a distant point the height of level of water in a reservoir or ditch, or the pressure of steam or other fluid or other similar conditions.

One of the objects of the invention is to provide an electrical indicating device which will be substantially independent of changes of the pressure of the electric current used.

A further object of the invention is to provide such a device that will be more accurate and certain in its action than is the case with other instruments heretofore used for similar purposes.

A further object of the invention is to provide such a device which, when used with alternating current, avoids the necessity of employing variable contacts in the circuit of the line and the indications of which are not affected by such changes in electric frequency and pressure as now occur in actual practice.

Figure 5:
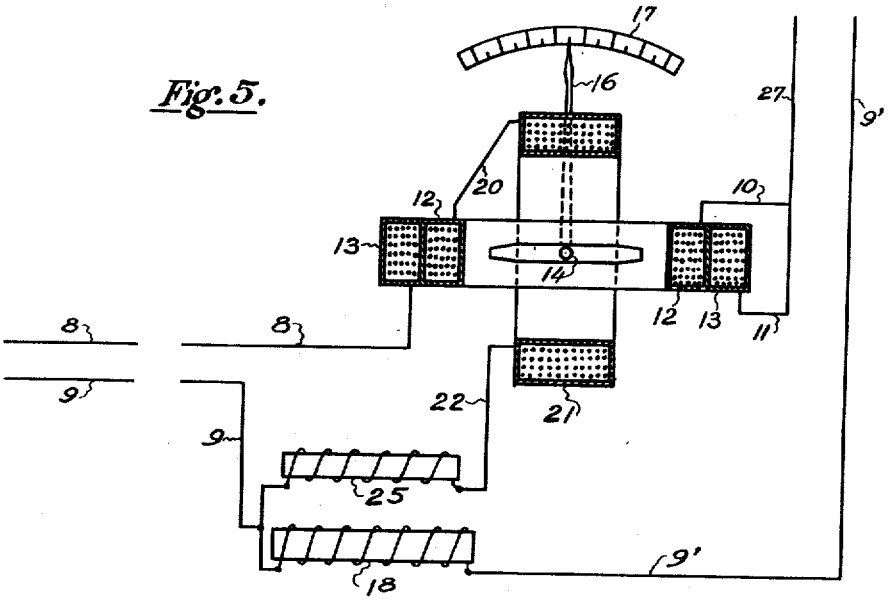
Figure 6:
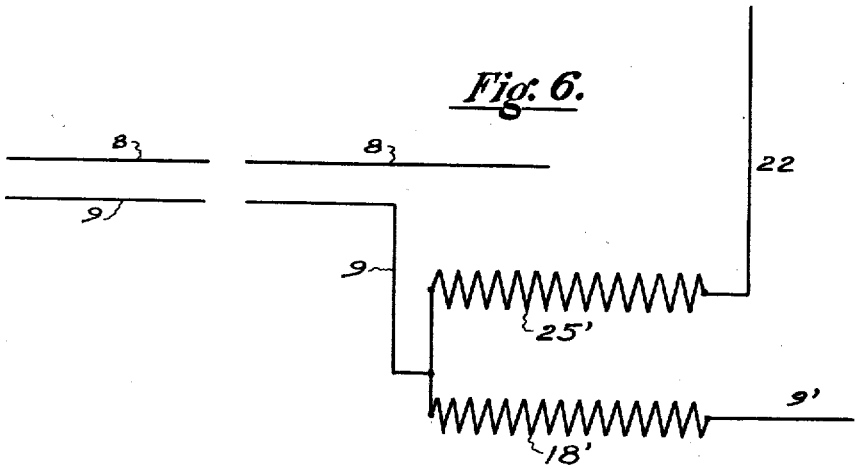

In the accompanying drawings: Figure 1 is a diagrammatic view of my invention as used with alternating current, and applied to means for indicating the level of water in a distant reservoir or ditch. Fig. 2 is a detail view showing a modified arrangement of coils. Fig. 3 is a similar view showing another modification thereof. Fig. 4 is a similar view, showing in modification a portion of the device for use with direct or alternating current. Fig. 5 discloses a modified arrangement of coils and solenoids, for use with alternating current. Fig. 6 discloses a modified arrangement of resistances and solenoids, similar to that disclosed by Fig. 5, for use with either direct or alternating current.

Referring to the drawing, 1 indicates a reservoir or ditch containing water of variable height. Pivotally secured to a suitable stationary support is an arm 2 carrying at its free end a float 3 acted upon by the water in the reservoir or ditch 1, and to said arm is pivoted, as shown at 4, one end of a rod 5 the other end of which is connected with a laminated soft iron core 6 of a fixed solenoid 7. By this means said iron core 6 is caused to move into the solenoid 7, the height of level of the water in the reservoir or ditch and the part, within the solenoid, of the iron core having corresponding values, the structure forming a variable reactance coil. Solenoid 7 of the variable reactance coil is connected by wires 8 and 9 to the station or point at which it is desired to know the height of level of the water in the reservoir or ditch 1.

At this station or point a wire 27 is divided into two branches 10, 11, connected respectively to fixed inner and outer co-axial solenoids or coils lying in the same plane. The outer solenoid 13, one terminal of which connects with branch wire 11, is connected at its other terminal by a wire 26, to one terminal, of a reactance coil 18, the other terminal of which reactance coil is connected to a wire 8 which is connected through the solenoid 7 and 9 to the wire 9′. The inner solenoid 12, one terminal of which is connected to wire 10, is connected at its other terminal, by a wire 20, to one terminal of a solenoid 21, the plane of which is at right angles to the plane of solenoids 12, 13, and the center of which coincides with the center of solenoids 12, 13. The other terminal of solenoid 21 is connected by a wire 22, to one terminal of a resistance 23 from the other terminal of which a wire 24 leads to one terminal of a reactance coil 25. The other terminal of this reactance coil is connected to wire 9. Wire 9 at its intersection with the terminal of reactance coil 25, is connected by wire 9′ to a source of alternating current, and wire 27 is connected to the other terminal of this source.

A shaft 14 is pivotally supported at each end and free to rotate in the intersection of the plane of solenoids 12, 13 with the plane of solenoid 21. A laminated, soft iron plate forming an armature 15 is mounted on said shaft within the solenoids 12, 13 and 21, and is free to rotate within the solenoids 12 and 13. A pointer 16 moving over a fixed scale 17 which is outside of solenoids 12, 13 and 21, is rigidly attached to the shaft 14.

The electric circuits of solenoids 12 and 13, considered from their respective starting points at wires 10, 11, encircle their common axis in opposite directions. Each of the solenoids 12, 13 and 21 consists, preferably, of solenoids which have coincident axes and which are separated from each other so as to allow the shaft 14 to rotate freely between them, the fixed pivotal supports of shaft 14 and the pointer 16 being outside the solenoids 12, 13 and 21. The resistance 23 is introduced into the branch circuit of which it forms a part, for adjustment, and may be given such value that the error of indication due to variations of time of alternations of the operating current will be a minimum for any desired height of level of water in the reservoir or ditch 1, or that the sum of the errors of indication, due to this cause throughout the whole range of the indicator or throughout any part of it, may be a minimum. The greater the ratio of the impedance of each of the branch circuits, of which wire 10 forms a part of the one, and wire 11 a part of the other, to its ohmic resistance, and the less the difference between these two ratios, the less is the error of indications, due to variations of time of alternations of the operating current. The magnetic circuit of each of the reactance coils 18 and 25, consists of laminated iron or steel of high magnetic susceptibility in series with a suitably arranged air gap or space occupied by material of low magnetic conductivity and retentiveness. In this way the inductance of each of these reactance-coils is made to be practically constant for such values of currents through them as are likely to occur.

It will be seen that the current flowing through the solenoid 12 and through solenoid 21 at right angles thereto is not directly affected by changes of height of level of the water in the reservoir or ditch 1 and the consequent changes of inductance of the solenoid 7. Any changes in height of level of the water in the reservoir or ditch will, however, affect a corresponding change in the inductance of solenoid 7, and consequently in the ratio of the current through solenoids 13 to the current through solenoids 12 and 21, and hence in the angular position of the plate 15 and pointer 16. When the rotative effects on plate 15 of the currents through solenoids 12 and 13 are such as to neutralize each other, this plate lies in the plane of solenoids 12 and 13 which is at right angles to the planes of solenoid 21. If the values of the inductance of solenoid 7 be now increased, the ratio of the current through the solenoid 13 to that through solenoid 12 will be diminished and the plate 15 will rotate to a corresponding angular position between the plane of solenoid 21 and that of solenoids 12, 13; but if the inductance of solenoid 7 be diminished, the corresponding angular position of the plate will be within the angle formed by the intersection of the plane of solenoids 12, 13 with that of solenoid 21, but on the other side of the plane of solenoids 12, 13. The angle of rotation of the plate 15, and consequently of the pointer 16, may be made to exceed 90 degrees and lies between the limits of 180 degrees.

In the modifications shown by Figs. 2 and 3, the inner solenoid is omitted and the terminal of the transverse solenoid which was formerly connected to the inner solenoid 12, is now connected to the branch wire 10. In Fig. 2, the planes of the solenoids intersect at right angles; in Fig. 3, the planes of the solenoids incline toward each other at an angle less than a right angle. The operation of the instrument with these modifications will be readily understood from the foregoing description. With either of these modifications, the angle of rotation of the pointer 16 is governed by the rotary effects upon armature 15, of the current in each of the solenoids 13 and 21, the variations of relative values of these currents depending upon the variations of inductance of the solenoid 7.

By using, instead of solenoid 7 and core 6, a rheostat 40, as shown at Fig. 4, the resistance 41 of which, in series with the wires 8, 9, is made to depend upon the height of level of the water in the reservoir of ditch 1, and by using resistances instead of reactance coils 18, and 25, the indicator may be operated from a source of direct current or of alternating current. In this case solenoids 12 and 21 may be designed for connection directly between wire 10 and wire 9, resistances in series with these solenoids being eliminated. The rheostat and direct or alternating current may be used in connection with the modifications shown in Figs. 2 and 3.

In the modification, for use with alternating current, shown in Fig. 5, the branch currents flowing through the circuits of which wires 10, 11 are a part, combine and flow through reactance coil 18 to wire 9′. By this arrangement, an increase in the value of the inductance of solenoid 7 (shown in Fig. 1) will cause a decrease in the value of the current flowing through the circuit of which it forms a part directly, and also will cause a greater current to flow through the circuit of which wire 10 forms a part directly. In like manner any decrease in the inductance of solenoid 7 will cause an increase of current through wire 11, and a decrease of current through wire 10. The change of the ratio of the currents flowing through the two branch circuits and consequently the relative values of the magnetic forces acting upon the armature 14 are governed by the value of the inductance of solenoid 7, and are independent of such changes in voltage and frequency of the operating current as are likely to occur. This modification is for use in connection with the arrangement of solenoids 12, 13 and 21, as shown in Fig. 1; with the arrangement of solenoids 13, 21, as shown in Fig. 2; or with the arrangement of solenoids 13, 21, as shown in Fig. 3.

Fig. 6 shows an arrangement similar to that of Fig. 5, for use with either direct or alternating current, when the rheostat (shown in Fig. 4) is used instead of solenoid 7 and iron core 6. In this case, resistance 18′ replaces reactance coil 18 (of Fig. 5), and resistance 25′ replaces reactance coil 25 (of Fig. 4). Any decrease in current through wires 8, 9, due to increase of resistance of the rheostat in series with them, causes the voltage between the terminals of resistance 18′ to diminish. This causes an increase of current through the circuit of which wire 10 forms a part. In like manner a decrease of resistance of the rheostat causes an increase of current flowing through the circuit of which wires 8 and 9 form a part, and a decrease of current through the circuit of which wire 10 forms a part. This modification is for use in connection with the arrangement of solenoids shown in Fig. 1, with the arrangement of solenoids 13, 21, as shown in Fig. 2; and with the arrangement of solenoids 13, 21, as shown in Fig. 3. Resistance 25′ may be eliminated and the wire 22 connected to resistance 18′ and wire 9 at their intersection.

In Fig. 1 solenoid 21 and either of solenoids 12, 13, may be connected between wires 11 and 26, and the remaining one of solenoids 12, 13, connected between wires 10 and 22, without affecting the accuracy of operation of the instrument. Also solenoid 21 and either of solenoids 12, 13 may be connected between wires 10 and 22, and the remaining one of solenoids 12, 13 connected between wires 11 and 26, without affecting the accuracy of operation of the instrument. Any suitable means of well known construction may be employed in connection with the pointer 16, shaft 14, and armature 15 for damping the oscillations of the pointer. In general, the branch circuit of which wire 10 forms a part directly may be replaced by two or more circuits without materially affecting the principles involved.

Having thus described the invention what I claim is new and desire to secure by Letters Patent is—

1. In an indicator for electrically designating at a station the height of level of a liquid supply situated at a distant point therefrom, the combination with a variable reactance coil located at said distant point, of means operatable by the liquid supply at such distant point for varying the reactance of said coil; a series electric circuit including said coil energized from a source of alternating current and including one of two coaxial solenoids lying in the same plane and a second reactance coil; a second series electric circuit energized from the same source of alternating current including the other of said solenoids, a third reactance coil and a resistance; a third solenoid, whose plane is at right-angles to the planes of said other solenoids, connected in series with one of said series circuits; and a pivotally mounted armature associated with said solenoids and adapted to be acted upon by magnetic forces due to the current flowing in each of said solenoids for designating the changes of the height of the level of the liquid at a distant point.

2. In an indicator for electrically designating at a station the height of level of a liquid supply situated at a distant point therefrom, the combination with a variable reactance coil located at said distant point, of means operable by the liquid supply at such distant point for varying the reactance of said coil, a series electric circuit energized from a source of alternating current, including one of two coaxial solenoids lying in the same plane and including a second reactance coil, a second series electric circuit energized from the same source of alternating current and including the other of said solenoids, said solenoids being wound in opposite directions about their common axis when considered with reference to either terminal of said source of alternating current, a third reactance coil and a resistance included in said second series circuit, a third solenoid whose plane is at right-angles to the planes of said other solenoids and which is connected in series to one of said electric circuits, and an armature pivotally mounted in said solenoids and adapted to be acted upon by magnetic forces due to the current flowing in each of said solenoids for designating the changes of the height of level of the liquid at said distant point.

3. In an indicator for electrically designating at a station the height of level of a liquid supply situated at a distant point therefrom, the combination of two electric circuits energized from a common source of electric energy, one only of said circuits extending to said distant point, with means situated at such distant point for automatically varying the ratio of the current flowing in one of said circuits to the current flowing in the other circuit in accordance with changes in the height of level of the liquid at such distant point, electrical connections between said means and the circuit extending to said distant point, a solenoid at the station energized from one of said circuits; a second solenoid of the same general order of resistance and magnetizing effect as the first solenoid energized from the other of said circuits; and an armature associated with such solenoids and directly acted upon thereby and whose position is determined by the resultant of the magnetic forces due to the current flowing through each of the electric circuits for designating the changes in the height of level of the liquid at the distant point, whereby the operation of said indicator is substantially independent of variations in the voltage of the source of electric energy.

4. In an indicator for electrically designating at a station the height of level of a liquid supply situated at a distant point therefrom, the combination of two electric circuits energized from a common source of electric energy, one only of said circuits extending to said distant point, with means situated at such distant point for automatically varying the ratio of the current flowing in one of said circuits to the current flowing in the other circuit in accordance with changes in the height of level of the liquid at such distant point, electrical connections between said means and the circuit extending to said distant point, a fixed hollow solenoid at the station, energized from one of said circuits; a second fixed hollow solenoid at the station energized from the other of said circuits and of the same general order of resistance and magnetizing effect as said first solenoid, and a pivotally mounted armature of iron having portions movable within said hollow solenoid and directly acted upon by magnetic forces due to the current flowing through each of the electric circuits for designating the changes in the height of level of the liquid at the distant point, said magnetic forces due to current flowing through one of said circuits tending to rotate said armature about its pivotal axis in one direction toward one position and the magnetic force due to current flowing through the other of said circuits tending to rotate said armature about its pivotal axis in a reverse direction toward a second position, said armature being adapted to assume a multiplicity of indicating positions intermediate said two positions whereby said indicating positions are substantially independent of voltage variations in said source of electric energy.

5. In an indicator for electrically designating at a station the height of level of a liquid supply situated at a distant point therefrom, the combination of two electric circuits energized from a common source of electric energy, only one of said circuits extending to said distant point, with means situated at such distant point for automatically varying the ratio of the current flowing in one of said circuits to the current flowing in the other circuit in accordance with changes in the height of level of the liquid at such distant point, electrical connections between said means and the circuit extending to said distant point, energized from one of said circuits; a second fixed hollow solenoid at the station energized from the other of said circuits and of the same general order of resistance and magnetizing effect as said first solenoid, a fixed hollow solenoid at the station, and a pivotally mounted armature of magnetizable material freely suspended in the magnetic field of said solenoid and directly acted upon by magnetic forces due to the current flowing through each of the electric circuits for shifting said armature to a multiplicity of indicating positions for designating by the position of the armature the changes in the height of level of the liquid at the distant point, the magnetic forces due to the current flowing through one of the electric circuits tending to align the armature with the axis of said solenoid and the magnetic forces due to the current flowing through the other of said circuits tending to move said armature out of alignment with the axis of said solenoid whereby said indicating positions of the armature are substantially independent of voltage variations in said source of electric energy.

6. In an indicator for electrically designating at a station the height of level of a liquid supply situated at a distant point therefrom, the combination of two electric circuits energized from a common source of electric energy, one only of said circuits extending to said distant point, with an impedance varying device situated at such distant point for automatically varying the ratio of the current flowing in one of said circuits to the current flowing in the other circuit in accordance with changes in the height of level of the liquid at such distant point, the current flowing through one of said circuits being maintained substantially constant and directly proportional to the voltage of the common source of electric energy, electrical connections between said impedance varying device and the circuit extending to said distant point, a solenoid at the station connected in series with said circuit having substantially constant current flowing therethrough, a second solenoid at the station connected in series with the other circuit and of the same general order of resistance current carrying capacity and megnetizing effect as the first solenoid, and an armature of magnetizable substance associated with such solenoid by being freely suspended in the magnetic field thereof, said armature being directly acted upon by magnetic forces due to the current flowing through each of the electric circuits for designating the changes in the height of level of the liquid at the distant point, first said solenoid being connected in said circuit of substantially constant current in order that the magnetic forces due to the current flowing therethrough will cause said armature to tend to align itself with the magnetic field produced thereby, the magnetic forces due to current flowing through the other of said circuits being applied to said armature transversely to the direction of the magnetic field of said solenoid to thereby cause said armature to move out of alignment with the field of said solenoid to a multiplicity of indicating positions, whereby the movement of said armature in response to changes in said impedance varying device is independent of variations in the voltage of the source of electric energy.

7. In an indicator for electrically designating at a station the height of level of a liquid supply situated at a distant point therefrom, the combination of two electric circuits energized from a common source of electric energy, one only of said circuits extending to said distant point, with means situated at such distant point for automatically varying the ratio of the current flowing in one of said circuits to the current flowing in the other circuit in accordance with changes in the height of level of the liquid at such distant point, electrical connections between said means and the circuit extending to said distant point, a fixed hollow air core solenoid at the station energized from one of said circuits, a second hollow solenoid of the same general order of resistance and current carrying capacity as the first solenoid disposed partially within the first solenoid and arranged with its magnetic axis at an angle thereto, and an armature of magnetic substance associated with such solenoid by being freely suspended in the magnetic field of said solenoid and directly acted upon from different directions by magnetic forces due to the current flowing through each of the electric circuits for shifting said armature to a multiplicity of indicating positions each of which is determined by the direction of the resultant of said magnetic forces and substantially independent of the magnitude of said resultant for designating by the position of the armature the changes in the height of level of the liquid at the distant point, whereby the operation of said indicator is substantially independent of variations in the voltage of the source of electric energy.

8. In an indicator for electrically designating at a station the height of level of a liquid supply situated at a distant point therefrom, the combination of two electric circuits energized from a common source of electric energy, one of said circuits extending to said distant point, with means situated at such distant point for automatically varying the ratio of the current flowing in one of said circuits to the current flowing in the other circuit in accordance with changes in the height of level of the liquid at such distant point, electrical connections between said means and the circuit extending to said distant point, a fixed hollow air core solenoid at the station energized from one of said circuits, a pivotally mounted armature of magnetic material extending completely through such solenoid, a second fixed hollow air core solenoid of the same order of resistance and magnetizing effect as said first solenoid and energized from the second of said circuits, said armature being directly acted upon by magnetic forces due to the current flowing through the solenoids in each of the electric circuits for designating the changes in the height of level of the liquid at the distant point, the magnetic forces due to the current flowing through one of said circuits tending to move said armature to a predetermined position and the magnetic forces due to the current flowing in the other of said circuits tending to move said armature to a different position to thereby cause said armature to assume a multiplicity of intermediate indicating positions, whereby the operation of said armature is substantially independent of variations in the voltage of said source.

9. In an indicator for electrically designating at a station the height of level of a liquid supply situated at a distant point therefrom, the combination of two electric circuits energized from a common source of electric energy, one of said circuits extending to said distant point, a variable impedance device for automatically varying the ratio of the current flowing in one of said circuits to the current flowing in the other circuit in accordance with changes in the height of level of the liquid at such distant point, electrical connections between said variable impedance device and the circuit extending to said distant point, a hollow solenoid at the station having a magnetizing winding electrically connected with the circuit extending to said distant point and adapted to be energized in accordance with changes in said impedance device, a second solenoid at the station having a magnetizing winding of the same order of resistance magnetizing effect and current carrying capacity as the winding of the first solenoid connected in the other electric circuit, and an armature of magnetic material having portions movable within said solenoid and adapted to be concurrently and directly acted upon by magnetic forces due to the current flowing through each of the electric circuits for designating the changes in the height of level of the liquid at the distant point, the magnetic forces due to current flowing through the winding of one of said solenoids tending to rotate said armature about its pivotal axis to a predetermined position in one direction and the magnetic forces produced by current flowing in the other circuit tending to rotate said armature to a different predetermined position, to thereby cause said armature to assume a multiplicity of intermediate indicating positions, whereby the movement of said armature to its different indicating positions is independent of the voltage of the source of energy.

10. In an electric level indicator, the combination of two concentric solenoids; an external circuit connected to each of said solenoids; means for passing an electric current through each of said solenoids and its external circuit; means depending upon the height of the level to be indicated for varying the impedance of the external circuit of one of said solenoids; and a member composed of magnetic substance freely suspended in the magnetic field of said solenoids and adapted to be rotated thereby to a multiplicity of indicating positions determined by the resultant of the magnetic forces for designating the changes in the height of the level of the liquids at the distant point whereby the movement of said member is substantially independent of variations in the voltage of said source.

11. In an electric level indicator, the combination of two adjacent solenoids of substantially the same order of relatively high inductance and current carrying capacity; an external circuit connected to each of said solenoids; means for conducting from a common source of alternating electric current through each of said solenoids and its external circuit; means depending upon the height of the level to be indicated for varying the reactance of the external circuit of one of said solenoids; and a magnetic member freely suspended in the common magnetic field of said solenoids and whose position is determined solely by the direction of the resultant common magnetic field for designating the changes in the height of the level of the liquids at the distant point; whereby said magnetic member is adapted to be moved to a multiplicity of indicating positions that are substantially independent of variations in the voltage of said source of alternating current.

12. In an electric level indicator, the combination of two adjacent coils of the same order of reactance and magnetizing effect and each made up of a multiplicity of turns, and electric circuits for each of said coils; means for conducting an alternating electric current through each of said coils and its circuit; means controlled by the variations in height of the level of the substance to be indicated for varying the reactance of the circuit of one of said coils; and a magnetic member of low retentiveness rotatably suspended in the magnetic fields of said coils and whose position is determined by the direction of the resultant of said fields for designating the changes in the height of the level of the liquid at the distant point whereby the indications of said indicator are substantially independent of variation in the voltage of the source of the alternating current.

13. In an electric level indicator, the combination of two adjacent coils of the same general order of impedance magnetizing effect and current carrying capacity, and electric circuits for each of said coils; means for conducting from a common source an alternating electric current through each of said coils and its circuit thereby producing a magnetic field that is a resultant of the fields of the two coils; means controlled by the variations in the height of the level of the substance to be indicated for varying the phase relation of the current to its pressure in one of the circuits; and indicating means associated with said coils controlled by the varying phase relations between said currents for designating the changes in the height of the level of the liquid at the distant point whereby the operation of said indicator is substantially independent of variations in the voltage of said source of alternating current.

14. In an electric level indicator, the combination of two concentric solenoids of the same general impedance magnetizing effect and current carrying capacity; and electric circuits therefor adapted to energize said solenoids thereby producing a magnetic field that is the resultant of the fields of the two coils; means for conducting an electric current through each of said solenoids and its circuit; means depending upon the height of the level to be indicated for varying the impedance of one of the circuits; adjustable resistance in one of said circuits external of said solenoids; and a magnetic member rotatably suspended in the common magnetic field of said solenoids and adapted to be rotated thereby to indicating positions independent of variations in the voltage of the source of electric energy.

15. In an electric level indicator for designating at a station the height of level of a liquid supply situated at a distant point, the combination of two electric circuits, one extending to said distant point, means for conducting from a common source an alternating electric current through each of said circuits, a coil in said circuit leading to said distant point, a magnetic member cooperating with said coil, means depending upon the height of the level to be indicated for changing the position of said member with reference to said coil, and means for indicating variations in the reactance of said circuits.

16. In an electric level indicator for designating at a station the height of level of a liquid supply situated at a distant point, the combination of two electric circuits, one extending to said distant point, means for conducting from a common source an alternating electric current through each of said circuits, a coil in said circuit leading to said distant point, a magnetic member cooperating with said coil, means depending upon the height of the level to be indicated for changing the position of said member with reference to said coil, and means for indicating variations in the reactance of said circuits including a pivotally mounted member of magnetic substance concurrently acted upon by magnetic forces produced by the current flowing through each of said circuits, the magnetic forces from one of said circuits tending to move said member in one direction and the magnetic forces from the other of said circuits tending to move said member in the other direction about its pivotal axis at an indicating position intermediate its extreme positions.

In witness whereof THE CLEVELAND TRUST COMPANY, assignee of the entire interest of GEORGE E. HENDERSON, now deceased, hereunto affixes its signature.

[L. S.] THE CLEVELAND TRUST COMPANY,
*Assignee of George E. Henderson, deceased,*
By R. AMALIN,
*Vice President.*

Attest:
A. J. PERFLER,
*Assistant Trust Officer.*

Certificate of Correction.

It is hereby certified that in Reissue Letters Patent No. 16,417, granted September 7, 1926, upon the application of Cleveland Trust Company, of Cleveland, Ohio, for an improvement in "Electric Level Indicators," errors appear in the printed specification requiring correction as follows: Page 4, lines 63 and 64, claim 5, strike out the words "a fixed hollow solenoid at the station" and insert the same after the word "point" in line 58, same claim; page 7, at the end of the specification, signature of trust officer, for "R. Amalin" read *R. Malm;* and that the said Letters Patent should be read with these corrections therein that the same may conform to the record of the case in the Patent Office.

Signed and sealed this 2d day of November, A. D. 1926.

[SEAL.]

WM. A. KINNAN,
*Acting Commissioner of Patents.*